United States Patent
He

(10) Patent No.: US 7,973,524 B1
(45) Date of Patent: Jul. 5, 2011

(54) MIXED MODE DIGITAL CONTROL FOR SWITCHING REGULATOR

(75) Inventor: Runsheng He, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 12/858,549

(22) Filed: Aug. 18, 2010

Related U.S. Application Data

(63) Continuation of application No. 11/227,387, filed on Sep. 15, 2005, now Pat. No. 7,782,039.

(60) Provisional application No. 60/675,791, filed on Apr. 27, 2005.

(51) Int. Cl.
*G05F 1/40* (2006.01)
(52) U.S. Cl. .................. 323/288; 323/224; 323/271
(58) Field of Classification Search .......... 323/282–290, 323/222, 224, 225, 241, 322; 363/17, 41, 363/71, 72, 98, 132; 307/64–66, 82
See application file for complete search history.

(56) References Cited

U.S. PATENT DOCUMENTS

| | | | |
|---|---|---|---|
| 4,466,052 A * | 8/1984 | Thrap | ............................ 363/41 |
| 4,725,940 A | 2/1988 | Henze | |
| 4,926,104 A | 5/1990 | King et al. | |
| 5,568,044 A | 10/1996 | Bittner | |
| 5,982,645 A | 11/1999 | Levran et al. | |
| 6,194,883 B1 | 2/2001 | Shimamori | |
| 6,242,896 B1 * | 6/2001 | Nieberger | .................... 323/285 |
| 6,583,610 B2 | 6/2003 | Groom et al. | |
| 6,621,256 B2 | 9/2003 | Muratov et al. | |
| 6,833,691 B2 | 12/2004 | Chapuis | |
| 7,007,176 B2 | 2/2006 | Goodfellow et al. | |
| 7,030,596 B1 | 4/2006 | Salerno et al. | |

* cited by examiner

*Primary Examiner* — Rajnikant B Patel

(57) ABSTRACT

A regulated power supply includes an inverter comprising an upper switch and a lower switch that are connected in series. A control module selectively controls the upper switch and the lower switch in one of a pulse width modulation (PWM) mode and a discrete control mode (DCM), receives a feedback signal from an output of the regulated power supply, and switches between the PWM mode and the DCM based on the feedback signal.

4 Claims, 10 Drawing Sheets

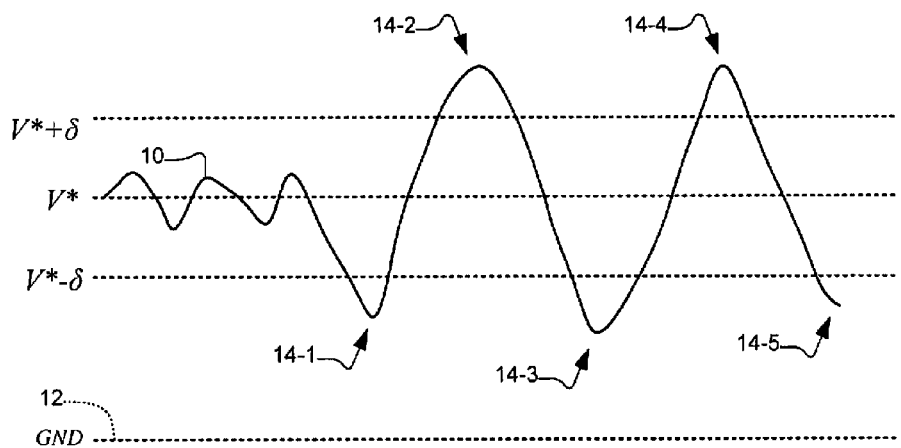
FIG. 1
PRIOR ART
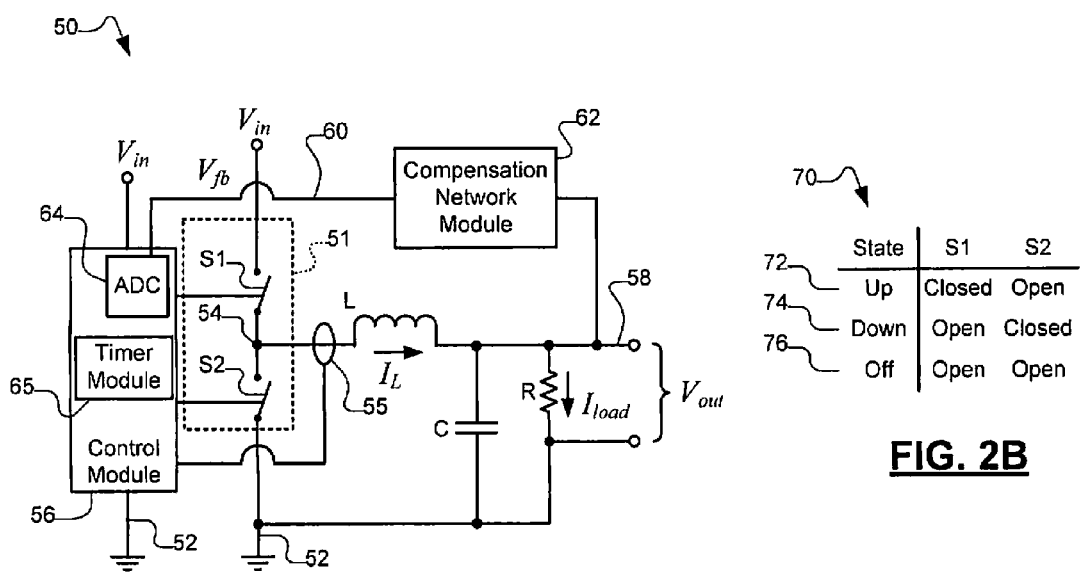
FIG. 2A
FIG. 2B

MIXED MODE DIGITAL CONTROL FOR SWITCHING REGULATOR

CROSS-REFERENCE TO RELATED APPLICATIONS

This application is a continuation of U.S. Non-Provisional patent application Ser. No. 11/227,387, filed Sep. 15, 2005, which claims the benefit of U.S. Provisional Patent Application No. 60/675,791, filed Apr. 27, 2005. The disclosures of the above applications are incorporated herein by reference.

FIELD OF THE INVENTION

The present invention relates to voltage regulators, and more particularly to control systems for voltage regulators.

BACKGROUND OF THE INVENTION

A voltage regulator converts an unregulated input voltage to a regulated output voltage. A voltage set point determines a magnitude of the regulated output voltage. The voltage regulator includes a control module that compares the voltage set point and the regulated output voltage and adjusts the regulated output voltage in accordance with the comparison.

The control module typically includes an analog-to-digital converter (ADC) having an input that receives the regulated output voltage. The ADC converts the regulated output voltage, which is an analog signal, to a digital value that can be used by the control module. The ADC has an input voltage range and an output resolution that are both generally fixed. For example, a particular ADC may be a 3-comparator design that has an input voltage range of $V^*+/-\delta$, where $V^*$ is the voltage set point and $\delta$ is a maximum output swing of the ADC. This example ADC could then provide a binary count of 00 when the regulated output voltage is below $V^*-\delta$, a binary count of 01 when the regulated output voltage is between $V^*-\delta$ and $V^*$, a binary count of 10 when the regulated output voltage is between $V^*$ and $V^*+\delta$, and a binary count of 11 when the regulated output voltage is greater than $V^*+\delta$.

Referring now to FIG. 1, the regulated output voltage 10 is shown relative to the voltage set point $V^*$. The lower limit of the ADC input voltage range is at $V^*-\delta$. The upper limit of the ADC input voltage range is at $V^*+\delta$. The voltages are measured with respect to a reference potential, such as ground, that is represented by a reference line 12.

The regulated output voltage 10 should remain between $V^*-\delta$ and $V^*+\delta$ for the ADC to generate the binary count that represents the actual magnitude of the regulated output voltage 10. When the regulated output voltage 10 goes above $V^*+\delta$ or below $V^*-\delta$, it is "out of range". When the regulated output voltage 10 goes out of range, such as is shown at peaks 14-1, 14-2, . . . , 14-5, referred to collectively as the peaks 14, the ADC is unable to provide a binary count that represents the actual magnitude of the regulated output voltage 10. Therefore, during the first peak 14-1, the control module is unable to determine a magnitude of difference between the voltage set point $V^*$ and the regulated output voltage 10. The remaining peaks 14-2, . . . , 14-5 show that the control module has become unstable due to the first peak 14-1.

One way to prevent the voltage regulator from becoming unstable when the ADC goes out of range is to use an ADC that has a larger input voltage range. However, increasing the input voltage range generally also requires increasing the ADC output resolution, which causes the ADC to increase in size, cost, and power consumption.

SUMMARY OF THE INVENTION

A regulated power supply is provided that includes an inverter comprising an upper switch and a lower switch that are connected in series. A control module selectively controls the upper switch and the lower switch in one of a pulse width modulation (PWM) mode and a discrete control mode (DCM), receives a feedback signal from an output of the regulated power supply, and switches between the PWM mode and the DCM based on the feedback signal.

In other features, the regulated power supply includes an analog to digital converter (ADC) that receives the feedback signal and that generates an ADC count. The control module receives the ADC count and switches between the PWM mode and the DCM based on the ADC count. The control module compares the feedback signal to a range and switches between the PWM mode and the DCM when the feedback signal is outside of the range.

In other features, the regulated power supply includes a current sensor that senses current and generates a current signal. The DCM includes a transient DCM and a steady-state DCM, and the control module switches between the transient DCM and the steady-state DCM based on the current signal.

In other features, the regulated power supply includes an energy storage device connected to the inverter. The control module charges the energy storage device by placing the inverter in an up state until a current through the energy storage device reaches a first predetermined current and the duration of the up state is $T_{up}$. The control module discharges the energy storage device by placing the inverter in a down state until the current through the energy storage device reaches a second predetermined current and the duration of the down state is $T_{down}$. The control module tracks a time $T_{off}$ that is based on an output voltage of the power supply reaching a predetermined voltage. The control module switches from the DCM to the PWM mode after a time $T_{load}$ that is based on the times $T_{up}$, $T_{down}$, and $T_{off}$. A capacitor has one end connected to the energy storage device and the energy storage device includes an inductor.

A method for operating a regulated power supply is provided and includes receiving a feedback signal from an output of the regulated power supply and selectively using one of a pulse width modulation (PWM) mode and a discrete control mode (DCM) to generate an output voltage. The selection is based on the feedback signal.

In other features, the receiving step includes generating an analog-to-digital converter (ADC) count based on the feedback signal. The selectively using step selects between the PWM mode and the DCM based on the ADC count. The method can also include comparing the feedback signal to a range, and selecting between the PWM mode and the DCM based on the feedback signal. The DCM includes a transient DCM and a steady-state DCM and the method includes reading a current signal and selectively, based on the current signal, using one of the transient DCM and the steady-state DCM.

In other features, the method can include providing an energy storage device within the regulated power supply. The method includes charging the energy storage device until a current through the energy storage device reaches a first predetermined current and wherein the duration of the charging is $T_{up}$, discharging the energy storage device until the current through the energy storage device reaches a second predetermined current and wherein the duration of the discharging is $T_{down}$, tracking a time $T_{off}$ that is based on the output voltage reaching a predetermined voltage, and switching from the DCM to the PWM mode after a time $T_{load}$ that is based on the times $T_{up}$, $T_{down}$, and $T_{off}$. The method can include connecting one end of a capacitor to the energy storage device, and the energy storage device can include an inductor.

A regulated power supply is provided that includes inverter means comprising upper switch means for switching and lower switch means for switching that are connected in series. The regulated power supply also includes control means for selectively controlling the upper switch means and the lower switch means in one of a pulse width modulation (PWM) mode and a discrete control mode (DCM), that receives a feedback signal from an output of the regulated power supply and that switches between the PWM mode and the DCM based on the feedback signal.

In other features, the regulated power supply includes analog to digital converter (ADC) means for receiving the feedback signal and generating an ADC count. The control means receives the ADC count and switches between the PWM mode and the DCM based on the ADC count. The control means compares the feedback signal to a range and switches between the PWM mode and the DCM when the feedback signal is outside of the range.

In other features, the regulated power supply includes current sensor means for sensing current and generating a current signal, wherein the DCM includes a transient DCM and a steady-state DCM, and wherein the control means switches between the transient DCM and the steady-state DCM based on the current signal.

In other features, the regulated power supply includes storage means connected to the inverter means. The control means charges the energy storage means by placing the inverter means in an up state until a current through the energy storage means reaches a first predetermined current and wherein the duration of the up state is $T_{up}$. The control means discharges the energy storage means by placing the inverter means in a down state until the current through the energy storage means reaches a second predetermined current and wherein the duration of the down state is $T_{down}$. The control means tracks a time $T_{off}$ that is based on an output voltage of the power supply reaching a predetermined voltage, and the control means switches from the DCM to the PWM mode after a time $T_{load}$ that is based on the times $T_{up}$, $T_{down}$, and $T_{off}$.

In other features, the regulated power supply includes capacitor means for providing a capacitance that is connected to the energy storage means. The energy storage means includes inductor means for providing an inductance.

A regulated power supply is provided that includes an inverter comprising an upper switch and a lower switch that are connected in series. A control module selectively controls the upper switch and the lower switch in one of a pulse width modulation (PWM) mode, a transient discrete control mode (DCM), and a steady state DCM and receives a feedback signal from an output of the regulated power supply. The control module compares the feedback signal to a range, transitions from the PWM mode to the transient DCM when the feedback signal is outside of the range, transitions from the transient DCM to the steady state DCM, and transitions from the steady state DCM to the PWM mode.

In other features, the regulated power supply includes an energy storage device, wherein the control module determines an estimated charging time for charging the energy storing device to have current through the energy storage device that is approximately equal to a load current during the steady state DCM. The control module charges the energy storage device for the estimated charging time and then transitions from the steady state DCM to the PWM mode.

In other features, the regulated power supply includes an analog to digital converter (ADC) that receives the feedback signal and that generates an ADC count. The control module receives the ADC count and switches between the PWM mode and the transient DCM based on the ADC count. The control module compares the feedback signal to a range and switches between the PWM mode and the transient DCM when the feedback signal is outside of the range.

In other features, the regulated power supply includes a current sensor that senses current and generates a current signal and wherein the control module switches between the transient DCM and the steady-state DCM based on the current signal. An energy storage device is connected to the inverter. The control module charges the energy storage device by placing the inverter in an up state until a current through the energy storage device reaches a first predetermined current and wherein the duration of the up state is $T_{up}$. The control module discharges the energy storage device by placing the inverter in a down state until the current through the energy storage device reaches a second predetermined current and wherein the duration of the down state is $T_{down}$. The control module tracks a time $T_{off}$ that is based on an output voltage of the power supply reaching a predetermined voltage and switches from the DCM to the PWM mode after a time $T_{load}$ that is based on the times $T_{up}$, $T_{down}$, and $T_{off}$. A capacitor has one end connected to the energy storage device. The energy storage device includes an inductor.

A method is provided for operating a regulated power supply. The method includes receiving a feedback signal from an output voltage of the regulated power supply, comparing the feedback signal to a range, transitioning from using a pulse width modulation (PWM) mode to generate the output voltage to using a transient discrete control mode (DCM) to generate the output voltage when the feedback signal is outside of the range, transitioning from using the transient DCM to using a steady state DCM to generate the output voltage, and transitioning from using the steady state DCM to using the PWM mode to generate the output voltage.

In other features, the method includes providing an energy storage device and determining an estimated charging time for charging the energy storing device to have current through the energy storage device that is approximately equal to a load current during the steady state DCM. The method also includes charging the energy storage device for the estimated charging time and then performing said transitioning step from using the steady state DCM.

In other features, the method includes generating a count from the feedback signal. The method also includes receiving the count and transitioning, based on the count, between using the PWM mode and using the transient DCM to generate the output voltage. The method also includes comparing the feedback signal to a range and transitioning, based on the feedback signal being outside of the range, between using the PWM mode and using the transient DCM to generate the output voltage.

In other features, the method includes sensing current and generating a current signal, and transitioning, based on the current signal, between using the transient DCM and using the steady-state DCM to generate the output voltage. The method includes providing an energy storage device within the regulated power supply. The method includes charging the energy storage device until a current through the energy storage device reaches a first predetermined current and wherein the duration of the charging is $T_{up}$, discharging the energy storage device until the current through the energy storage device reaches a second predetermined current and wherein the duration of the discharging is $T_{down}$, tracking a time $T_{off}$ that is based on the output voltage reaching a predetermined voltage, and transitioning from using the DCM to using the PWM mode after a time $T_{oad}$ that is based on the times $T_{up}$, $T_{down}$, and $T_{off}$. The method includes connecting a capacitor to the energy storage device. The method includes the energy storage device including an inductor.

A regulated power supply is provided that includes inverter means comprising upper switch means for switching and lower switch means for switching that are connected in series. The regulated power supply also includes control means for selectively controlling the upper switch means and the lower switch means in one of a pulse width modulation (PWM) mode, a transient discrete control mode (DCM), and a steady state DCM and for receiving a feedback signal from an output of the regulated power supply. The control means compares the feedback signal to a range, transitions from the PWM mode to the transient DCM when the feedback signal is outside of the range, transitions from the transient DCM to the steady state DCM, and transitions from the steady state DCM to the PWM mode.

In other features, the regulated power supply includes energy storage means, wherein the control means determines an estimated charging time for charging energy storage means to have current through the energy storage means that is approximately equal to a load current during the steady state DCM. The control means charges the energy storage means for the estimated charging time and then transitions from the steady state DCM to the PWM mode.

In other features, the regulated power supply includes an analog to digital converter (ADC) means for receiving the feedback signal and generating an ADC count. The control means receives the ADC count and switches between the PWM mode and the transient DCM based on the ADC count. The control means compares the feedback signal to a range and switches between the PWM mode and the transient DCM when the feedback signal is outside of the range.

In other features, the regulated power supply includes a current sensor means for sensing current and generating a current signal and wherein the control means switches between the transient DCM and the steady-state DCM based on the current signal. The regulated power supply includes an energy storage means connected to the inverter means. The control means charges the energy storage means by placing the inverter means in an up state until a current through the energy storage means reaches a first predetermined current and wherein the duration of the up state is $T_{up}$. The control means discharges the energy storage means by placing the inverter means in a down state until the current through the energy storage means reaches a second predetermined current and wherein the duration of the down state is $T_{down}$. The control means tracks a time $T_{off}$ that is based on an output voltage of the power supply reaching a predetermined voltage and switches from the DCM to the PWM mode after a time $T_{load}$ that is based on the times $T_{up}$, $T_{down}$, and $T_{off}$. The regulated power supply includes a capacitor means for providing a capacitance, where the capacitor means includes one end connected to the energy storage device. The energy storage means includes an inductor means for providing an inductance.

A control module for a regulated power supply is provided and includes an analog to digital converter (ADC) that generates a digital feedback signal from an analog feedback signal. A switch control module generates a first switch control signal and a second switch control signal. A mode selection module compares the digital feedback signal to a range and changes the switch control module from a pulse width modulation (PWM) mode to a discrete control mode (DCM) when the digital feedback signal is outside of the range.

In other features, the DCM includes a transient DCM and a steady-state DCM. The control module includes an input that receives a current signal and the mode selection module changes the switch control module from the transient DCM to the steady-state DCM based on the current signal and the digital feedback signal. The mode selection module measures timing relationships between the current signal and digital feedback signal when the switch control module is operating in the steady-state DCM and changes the switch control module from steady-state DCM to PWM based on the timing relationships.

A control method for a regulated power supply is provided and includes generating a digital feedback signal from an analog feedback signal, generating a first switch control signal and a second switch control signal, comparing the digital feedback signal to a range and changing the first switch control signal and the second switch control signal from a pulse width modulation (PWM) compatible mode to a discrete control mode (DCM) compatible mode when the digital feedback signal is outside of the range.

In other features, the DCM compatible mode includes a transient DCM compatible mode and a steady-state DCM compatible mode. The control method further includes receiving a current signal and changing from the transient DCM compatible mode to the steady-state DCM compatible mode based on the current signal and the digital feedback signal. The control method further includes measuring timing relationships between the current signal and the digital feedback signal when the first switch control signal and the second switch control signal are operating in the steady-state DCM compatible mode, and changing from the steady-state DCM compatible mode to the PWM compatible mode based on the timing relationships.

A control module for a regulated power supply is provided and includes analog to digital converter (ADC) means for generating a digital feedback signal from an analog feedback signal, switch control means for generating a first switch control signal and a second switch control signal, and mode selection means for comparing the digital feedback signal to a range and changing the switch control means from a pulse width modulation (PWM) mode to a discrete control mode (DCM) when the digital feedback signal is outside of the range.

In other features, the DCM includes a transient DCM and a steady-state DCM. The control module further includes input means for receiving a current signal and the mode selection means changes the switch control means from the transient DCM to the steady-state DCM based on the current signal and the digital feedback signal. The mode selection means measures timing relationships between the current signal and digital feedback signal when the switch control means is operating in the steady-state DCM, and changes the switch control means from steady-state DCM to PWM based on the timing relationships.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present invention will become apparent from the detailed description provided hereinafter. It should be understood that the detailed description and specific examples, while indicating the preferred embodi-

BRIEF DESCRIPTION OF THE DRAWINGS

The present invention will become more fully understood from the detailed description and the accompanying drawings, wherein:

FIG. 1 illustrates a waveform of a regulated output voltage from a voltage regulator of the prior art;

FIG. 2A illustrates a schematic diagram of a voltage regulator;

FIG. 2B illustrates a state chart of switch states of an inverter of the voltage regulator of FIG. 2A;

DETAILED DESCRIPTION OF THE PREFERRED EMBODIMENTS

Figure 3:
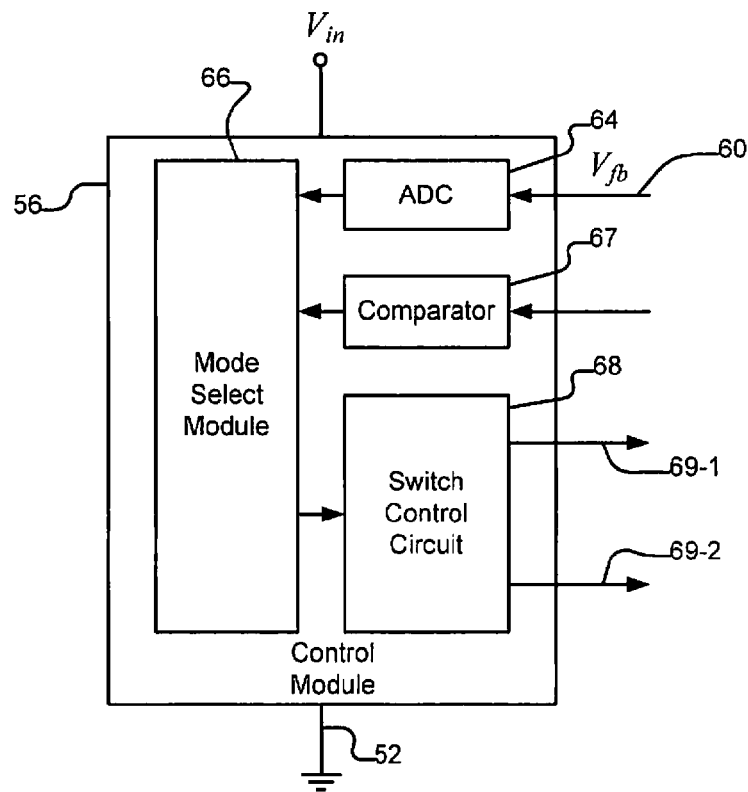
FIG. 3 illustrates a functional block diagram of a controller for a voltage regulator.

The following description of the preferred embodiment(s) is merely exemplary in nature and is in no way intended to limit the invention, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present invention.

Referring now to FIG. 2A, a schematic diagram of a voltage regulator 50 is shown. The voltage regulator 50 includes an inverter 51 that comprises an upper switch S1 and a lower switch S2. The upper and lower switches S1, S2 are connected in series between an unregulated power supply $V_{in}$ and a reference node 52, such as ground or other reference potential. The upper switch 51 and the lower switch S2 can be provided by transistors, triacs, thyristors, and/or any other suitable switching devices.

A node 54 is located between the upper switch 51 and the lower switch S2 and is connected to one end of an inductor L. A current sensor 55 measures an inductor current $I_L$ and generates an inductor current signal to a control module 56. A second end of the inductor L is connected to a first end of a capacitor C and an output terminal 58. A second end of the capacitor C is connected to the reference node 52. A resistor R represents a load that is connected across a regulated output voltage $V_{out}$ (across the output terminal 58 and the reference node 52). The load passes a load current $I_{load}$.

A feedback signal 60 feeds back the regulated output voltage $V_{out}$ to an input of the control module 56. The feedback signal 60 may be modified by an optional compensation network module 62. The compensation network 62 can include various proportional, integral, derivative, lead, and/or lag function modules connected in various combinations. The particular combination used in an application dependes on a desired settling time and/or degree of regulation that is desired of the regulated output voltage $V_{out}$. The control module 56 includes an ADC 64 that converts the feedback signal 60 to a digital count. The control module 56 may be powered by the unregulated power supply $V_{in}$. The control module 56 also includes a timer module 65 for tracking times $T_{up}$, $T_{down}$, $T_{off}$, and $T_{load}$ as described below.

The voltage regulator 50 can operate in a plurality of different modes. The voltage regulator 50 generally operates in a PWM mode until the feedback signal 60 voltage, $V_{fb}$, causes the ADC 64 to go out of range. The ADC goes out of range when the feedback signal voltage, $V_{fb}$, exceeds a voltage range that correlates with the ADC's 64 range of digital counts. For example, the ADC 64 may be out of range when the voltage regulator 50 is first switched on or when the load current $I_{load}$ changes abruptly. When the ADC 64 goes out of range, it can be difficult for the PWM mode to remain stable and/or keep the regulated output voltage $V_{out}$ within a desired range or tolerance. The voltage regulator 50 therefore switches through a transient discrete control mode (DCM) and a steady-state DCM upon the ADC 64 going out of range. The DCMs are inherently stable and the voltage regulator 50 remains in the DCMs while it estimates a charging time for the inductor L to have the load current $I_{load}$. The voltage regulator 50 uses the charging time to charge the inductor L and then re-enters the PWM mode in a stable condition.

This multi-mode method allows the voltage regulator 50 to operate with a low-power and low-resolution ADC 64 without requiring complex control algorithms and/or complex functions in the compensation network module 62. The following description details how the voltage regulator 50 operates in the PWM mode, the transient DCM, and the steady-state DCM. The description then provides working examples of the voltage regulator 50 switching between the PWM mode, the transient DCM, and the steady-state DCM.

Referring now to FIG. 2B, a state chart 70 indicates whether the upper switch S1 and the lower switch S2 are open or closed for different operating states of the inverter 51. In an up state 72, the upper switch S1 is closed and the lower switch S2 is open. In a down state 74, the upper switch S1 is open and the lower switch S2 is closed. In an off state 76, the upper switch S1 is open and the lower switch S2 is open.

Referring now to FIG. 3, a functional block diagram is shown of the control module 56. A mode select module 66 determines in which one of the plurality of different modes to operate the voltage regulator 50. The mode select module 66 makes the determination based on inputs from the ADC 64 and a comparator module 67. The comparator module 67 receives the inductor current signal from the current sensor 55 and compares the inductor current signal to one or more predetermined current levels. The comparator module 67 then communicates a comparison result to the mode select module 66.

The mode select module 66 includes an output that communicates with a switch control circuit 68. The switch control circuit 68 generates a first switch control signal 69-1 and a second switch control signal 69-2 that control the first and second switches S1 and S2, respectively. The first switch control signal 69-1 and the second switch control signal 69-2 are referred to collectively as the switch control signals 69. The switch control circuit 68 generates the switch control signals 69 such that they open and close the first and second switches S1, S2 according to the operating mode selected by the mode select module 67. A detailed description of the operation of the first and second switches S1, S2, as controlled by the switch control signals 69, is provided in the following description.

Figure 4:
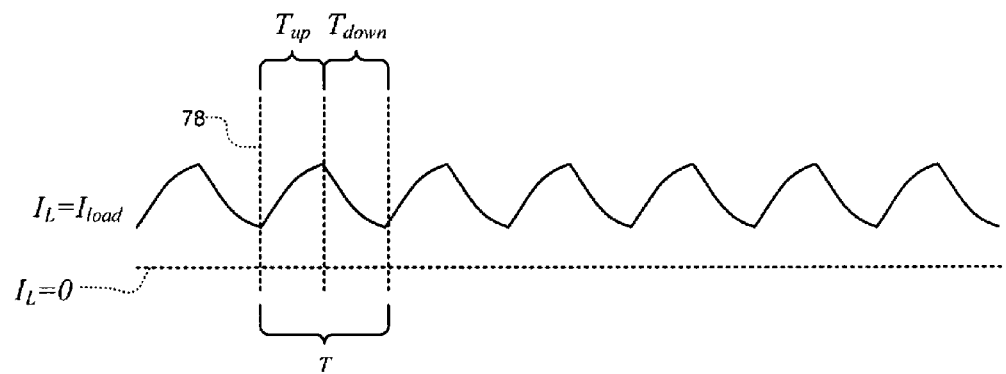
FIG. 4 illustrates waveforms of a voltage regulator that is operating in a pulse-width modulated (PWM) mode.

Referring now to FIG. 4, an unscaled waveform of inductor current $I_L$ is shown while the voltage regulator 50 is operating in the PWM mode. The inductor current $I_L$ is shown with respect to $I_L$=0. The PWM mode provides less inductor current $I_L$ ripple than the transient DCM and the steady-state DCM; however the PWM mode can require a complex control algorithm to maintain stability if the ADC 64 drops out of range. Therefore, the voltage regulator 50 only operates in the PWM mode until the ADC 64 drops out of range, and then temporarily switches to the DCMs in accordance with a method described below.

Operation of the PWM mode will now be described. A PWM cycle begins at a time 78. At the time 78, the control module 56 places the inverter 51 in the up state 72 for a time $T_{up}$. At the end of the time $T_{up}$, the control module 56 places the inverter 51 in the down state for a time $T_{down}$, thereby ending the PWM cycle.

The sum of the times $T_{up}$ and $T_{down}$ is a constant period, T. In some embodiments the period T is equal to one microsecond, which corresponds to a frequency of one megahertz. The durations of the times $T_{up}$ and $T_{down}$ are a function of the comparison between the average feedback signal 60 voltage $V_{fb}$ and a set point voltage V* of the control module 56. The control module 56 increases the time $T_{up}$ and decreases the time $T_{down}$ when the comparison indicates that the average feedback signal 60 voltage $V_{fb}$ is less than the set point voltage V. The control module 56 decreases the time $T_{up}$ and increases the time $T_{down}$ when the comparison indicates that the average feedback signal 60 voltage $V_{fb}$ is greater than the set point voltage V*.

A ratio of $T_{up}$ and $T_{down}$ is referred to as a duty cycle D, which can be mathematically represented as $$D=T_{up}/T, \text{ substituting for T gives} \quad (1)$$

$$D=T_{up}/(T_{down}+T_{up}). \quad (2)$$

Also, $$D=V_{out}/V_{in}. \quad (3)$$

Figure 5:
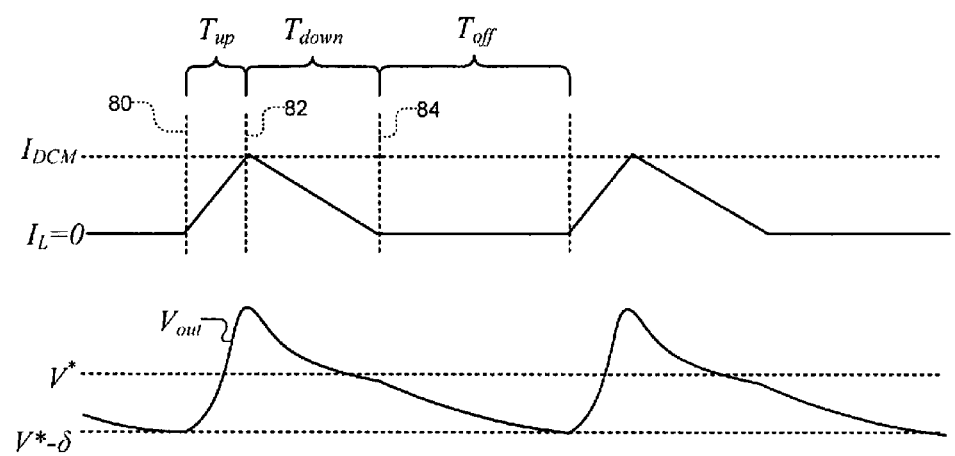
FIG. 5 illustrates waveforms of a voltage regulator that is operating in a steady-state discrete control mode (DCM)

Referring now to FIG. 5, unscaled waveforms of the inductor current $I_L$ and the regulated output voltage $V_{out}$ are shown while the voltage regulator 50 is operating in the steady-state DCM. The voltage regulator 50 operates in the steady-state DCM after the ADC 64 has gone out of range and completed the transient DCM, which is described below. The steady-state DCM allows the control module 56 to estimate the charging time for the inductor L to have an averaged inductor current $I_L$ approximately equal to the load current $I_{load}$ and then switches back to the PWM mode with the ADC 64 back in range.

A steady-state DCM cycle begins at a time 80. At the time 80, the control module 56 places the inverter 51 in the up state 72 until the inductor current $I_L$ rises to a peak current $I_{DCM}$, which occurs at a time 82. The value of $I_{DCM}$ is fixed and is generally chosen to be about 100% greater than a maximum expected load current $I_{load}$. The control module 56 records the time $T_{up}$ as the difference between the time 82 and the time 80. The duration of the time $T_{up}$ is not necessarily the same between the DCM and PWM modes.

When the inductor current $I_L$ reaches $I_{DCM}$, the control module 56 places the inverter 51 in the down state 74 until the inductor current $I_L$ falls to zero, which occurs at a time 84. The control module 56 records the time $T_{down}$ as the difference between the time 84 and the time 82. The duration of the time $T_{down}$ is not necessarily the same between the DCM and PWM modes.

After the time 84, the control module 56 places the inverter 51 in the off state 76, which turns off the inductor current $I_L$. The control module 56 holds the inverter 51 in the off state 76 until the feedback signal 60 indicates that the regulated output voltage $V_{out}$ has reached a lower threshold V*−δ, where δ is a maximum output swing of the ADC 64. The control module 56 records the duration of the off state 76 as a time $T_{off}$. This completes the steady-state DCM cycle.

During the steady-state DCM cycle, the charge dissipated through the load during the time $T_{off}$ is equal to the charge accumulated in the capacitor C during the times $T_{up}$ and $T_{down}$. This relationship is shown mathematically as $$I_{load}=0.5*(T_{up}+T_{down})*I_{DCM}/(T_{up}+T_{down}+T_{off}) \text{ where} \quad (4)$$

$$I_{DCM}=(T_{down}*V_{out}/L). \quad (5)$$

The control module 56 uses this relationship in the method described below. The method sets the inductor current $I_L$ equal to the load current $I_{load}$ prior to returning the voltage regulator 50 to the PWM mode.

Figure 6A:
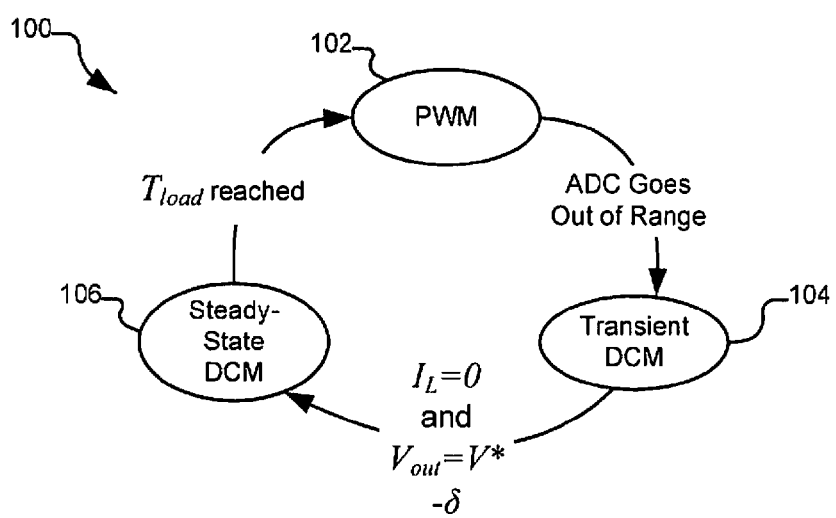
FIG. 6A illustrates a state diagram of transitions between operating modes of a voltage regulator.

Referring now to FIG. 6A, a method 100 is shown for switching the voltage regulator 50 between the PWM mode, the transient DCM, and the steady-state DCM. The method 100 allows the voltage regulator 50 to normally operate in the PWM mode and have a low ripple current through the inductor L. However, if the ADC 64 goes out of range, the method 100 causes the voltage regulator 50 to briefly operate in the inherently stable DCMs. Since the DCMs have a higher ripple current through the inductor than the PWM mode, the voltage regulator 50 operates in the DCMs only until it can be switched back to the PWM mode with the ADC 64 back in range.

The method 100 can be stored as a computer program in a memory (not shown) of the mode select module 66. The mode select module 66 can include a microprocessor (not shown) that is connected to the memory and executes the method 100.

Control begins in the PWM state 102, which places the voltage regulator 50 in the PWM mode. Control changes to a transient DCM state 104 when the ADC 64 goes out of range. In the transient DCM state 104, the voltage regulator 50 operates in the transient DCM, which is detailed below, until the comparator module 66 determines that the inductor current $I_L$ is equal to zero and the ADC 64 indicates that the regulated output voltage $V_{out}$ is equal to V*−δ.

After the transient DCM state 104, control changes to a steady-state DCM state 106. In the steady-state DCM state 106, the mode select module 66 operates the voltage regulator 50 in the steady-state DCM, which was described above, to determine the time $T_{load}$. The time $T_{load}$ represents how long the inverter 51 must operate in the up state 72 of the steady-state DCM cycle to make the inductor current $I_L$ equal to the load current $I_{load}$. During the steady-state DCM cycle, the time $T_{load}$ is provided by the equation $$T_{load} = [0.5*(T_{up}+T_{down})*T_{up}]/[T_{up}+T_{down}+T_{off}]. \quad (6)$$

Control remains in the steady-state DCM state 106 until it determines $T_{load}$ in accordance with equation (6) and holds the inverter 51 in the up state 72 for the duration of $T_{load}$. Once the time $T_{load}$ has expired, the inductor current $I_L$ and the load current $I_{load}$ are approximately equal and control switches back to the PWM state 102 with the ADC 64 back in range.

Figure 6B:
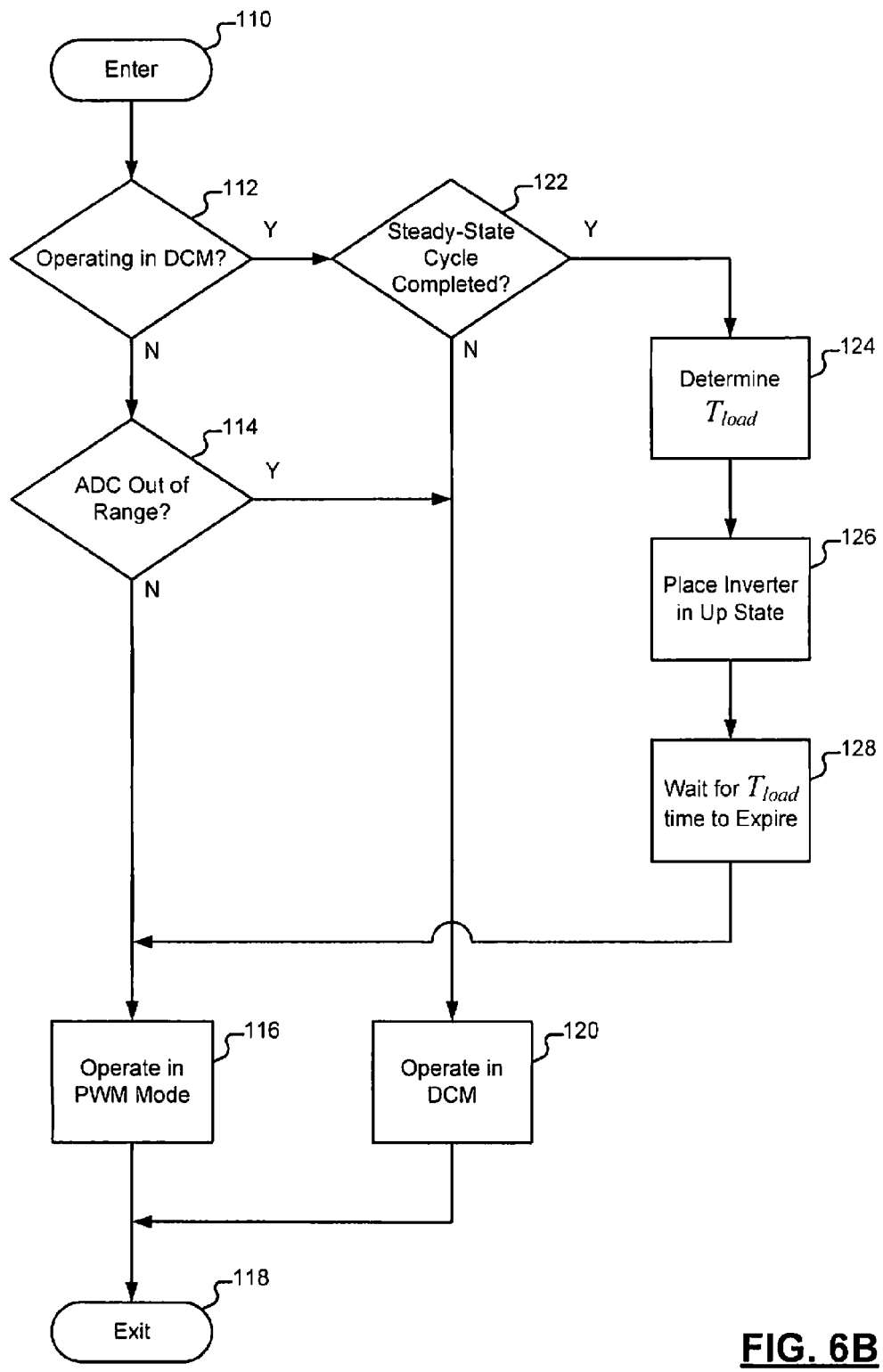
FIG. 6B illustrates steps of a method for operating a voltage regulator.

Referring now to FIG. 6B, a flow chart representation of the method 100 is shown. Control enters at block 110 and proceeds to decision block 112. In decision block 112, control determines whether the voltage regulator 50 is presently operating in DCM. If not, control proceeds to decision block 114 and determines whether the ADC 64 is out of range. If not, control proceeds to block 116 and operates the voltage regulator 50 in the PWM mode (FIG. 3). On the other hand, if the ADC 64 is out of range in decision block 114, then control proceeds to block 120 and operates the voltage regulator 50 in the DCM. Control exits through block 118 after it completing one of block 116 and 120.

Figure 7A:
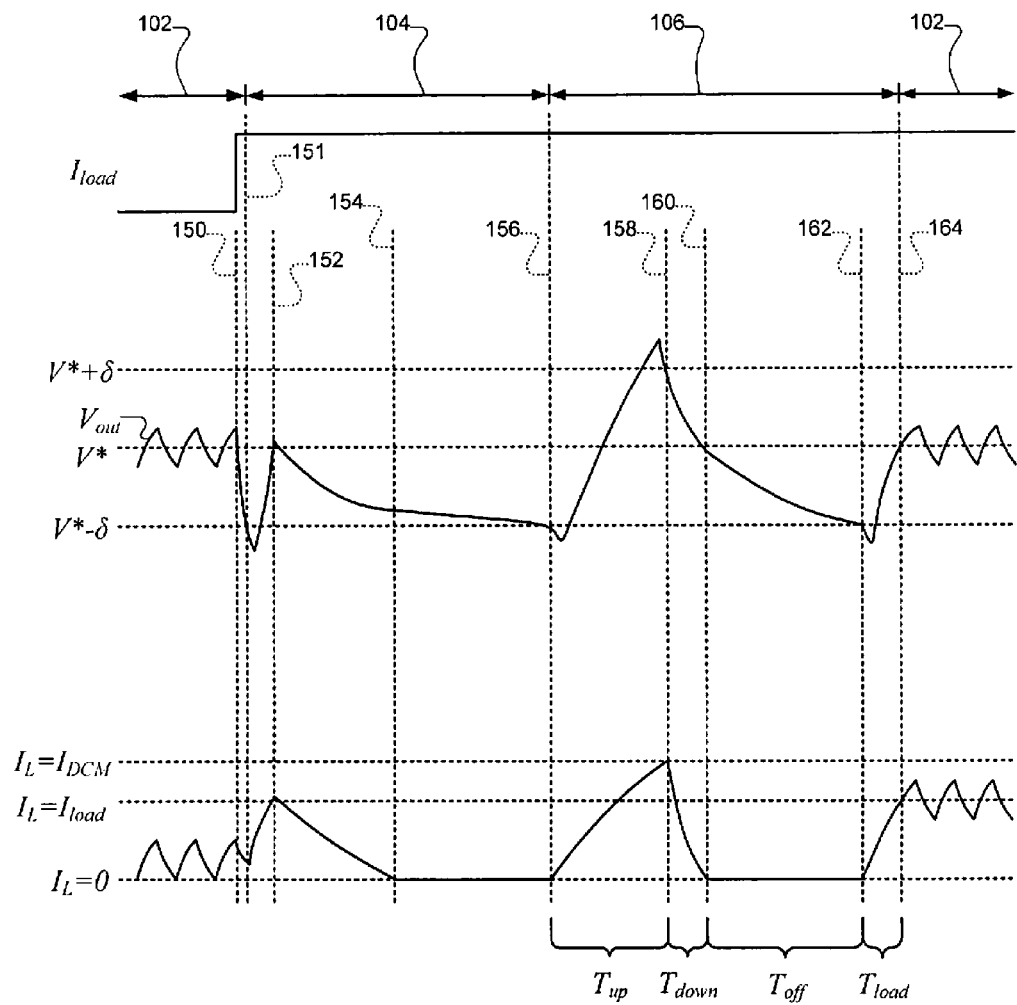
FIGS. 7A and 7B illustrate waveforms of a voltage regulator that is switching between a PWM mode, a transient DCM, and a steady-state DCM.

Returning now to decision block 112, control proceeds to decision block 122 when the voltage regulator 50 is operating in DCM. In decision block 122 control determines whether the voltage regulator 50 has completed one cycle of steady-state DCM (FIG. 4) since control last entered DCM at block 120. If one cycle of steady-state DCM has not been completed, then control proceeds to block 120 and continues operating the voltage regulator 50 in DCM. On the other hand, if one cycle of steady-state DCM has been completed in decision block 122, then control proceeds to block 124 and determines $T_{load}$ as described above. Control then proceeds to block 126 and places the inverter 51 in the up state 72. Control then proceeds to block 128 and holds the inverter 51 in the up state 51 for the time $T_{load}$. Control then proceeds to block 116 and returns to operating the voltage regulator 50 in the PWM mode. Referring now to FIG. 7A, operation of the voltage regulator 50 will be described. The working example of FIG. 7A assumes that the optional compensation network module 62 is not used so that $V_{fb}=V_{out}$. If a compensation network module is employed, appropriate correction may be performed.

The voltage regulator 50 operates in the PWM state 102 so long as the regulated output voltage $V_{ow}$ remains within the range of the ADC 64. At a time 150, the load current $I_{load}$ abruptly increases and causes the regulated output voltage $V_{out}$ to drop below $V^*-\delta$. The drop in the regulated output voltage $V_{out}$ causes the ADC 64 to go out of range at a time 151. Control therefore switches the voltage regulator 50 to the transient DCM state 104.

Upon entering the transient DCM state 104, the control module 56 switches the inverter 51 to the up state 72 until the regulated output voltage $V_{out}$ is equal to $V^*$, which occurs at a time 152. After the time 152, the control module 56 switches the inverter 51 to the down state 74 until the inductor current $I_L$ is equal to zero, which occurs at a time 154. At the time 154, the control module 56 switches the inverter 51 to the off state 76 until the regulated output voltage $V_{out}$ falls to $V^*-\delta$, which occurs at a time 156.

The time 156 marks the end of the transient DCM state 104 and the beginning of the steady-state DCM state 106. At the time 156, the control module 56 begins the process of using $T_{up}$, $T_{down}$, and $T_{off}$ to determine $T_{load}$. At the time 156, the control module 56 switches the inverter 51 to the up state 72 until the inductor current $I_L$ is equal to $I_{DCm}$, which occurs at a time 158. The time $T_{up}$ is equal to the difference between the times 158 and 156. After the inductor current $I_L$ reaches $I_{DCM}$, the control module 56 switches the inverter 51 to the down state 74 until the inductor current $I_L$ is equal to zero, which occurs at a time 160. The time $T_{down}$ is equal to the difference between the times 160 and 158.

At the time 160, the control module 56 switches the inverter 51 to the off state 76. The control module 56 keeps the inverter 51 in the off state 76 until the regulated output voltage $V_{out}$ falls to $V^*-\delta$, which occurs at a time 162. The time $T_{off}$ is equal to the difference between the times 160 and 162.

At the time 162, the control module 56 determines $T_{load}$ in accordance with equation (6) and the times $T_{up}$, $T_{down}$, and $T_{off}$. The control module 56 then switches the inverter 51 to the up state 72 for the time $T_{load}$. The time $T_{load}$ expires at a time 164. At the time 164, the inductor current $I_L$ is equal to the load current $I_{load}$, within approximation errors of the control module 56, and control switches back to the PWM state 102. When control switches back to the PWM state 102, the regulated output voltage $V_{out}$ will be between $V^*-\delta$ and $V^*+\delta$ and the control module 56 is able to resume stable operation in the PWM mode.

Figure 7B:
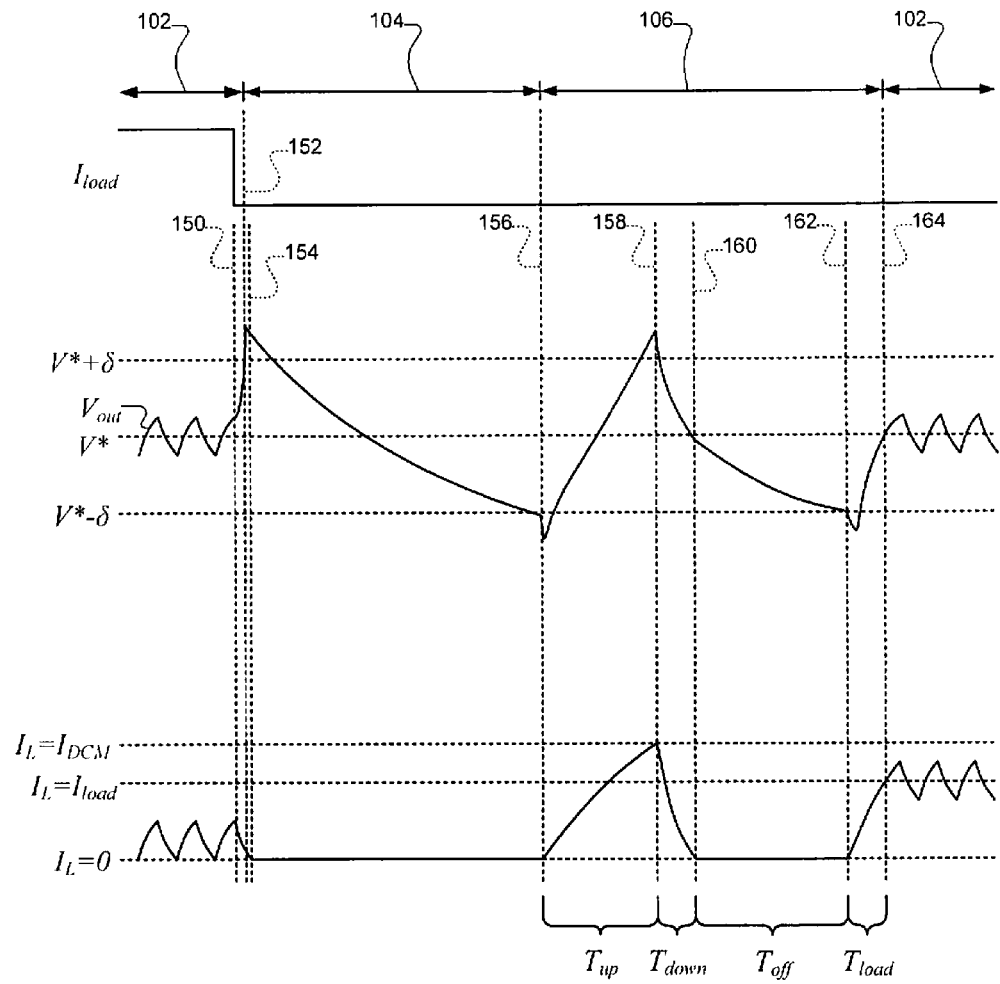

Referring now to FIG. 7B, the method 100 is shown being used when the regulated output voltage $V_{out}$ rises out of range due to an abrupt decrease in the load current $I_{load}$ at the time 150. The decreased load current $I_{load}$ causes the regulated output voltage $V_{out}$ to rise out of range at the time 152. Since the regulated output voltage is already above $V^*$, the transient DCM state 104 skips placing the inverter 51 in the up state 72. Instead, the transient DCM state 104 begins by placing the inverter 51 in the down state 74 at the time 152. Control then switches the inverter 51 to the off state 76 when the inductor current $I_{load}$ falls to zero at the time 154. At the time 154, control switches the inverter 51 to the off state 76 until the regulated output voltage $V_{out}$ falls to $V^*-\delta$, which occurs at the time 156. From the time 156 onward, control enters the steady-state DCM state 106, determines $T_{load}$, and returns to the PWM state 102 as described above.

Figure 8A:
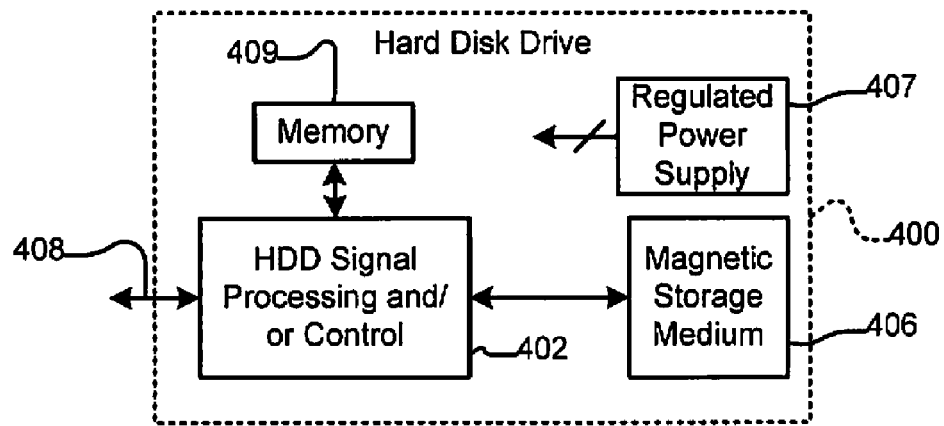
FIG. 8A illustrates the present invention arranged in a hard disk drive.

Referring now to FIGS. 8A-8G, various exemplary implementations of the present invention are shown. Referring now to FIG. 8A, the present invention can be implemented in a hard disk drive 400. The present invention may implement at least a portion of a regulated power supply module 407. The power supply module 407 includes one or more outputs that provide power to one or more of elements of the HDD 400. In some implementations, a signal processing and/or control circuit 402 and/or other circuits (not shown) in the HDD 400 may process data, perform coding and/or encryption, perform calculations, and/or format data that is output to and/or received from a magnetic storage medium 406.

The HDD 400 may communicate with a host device (not shown) such as a computer, mobile computing devices such as personal digital assistants, cellular phones, media or MP3 players and the like, and/or other devices via one or more wired or wireless communication links 408. The HDD 400 may be connected to memory 409 such as random access memory (RAM), low latency nonvolatile memory such as flash memory, read only memory (ROM) and/or other suitable electronic data storage.

Figure 8B:
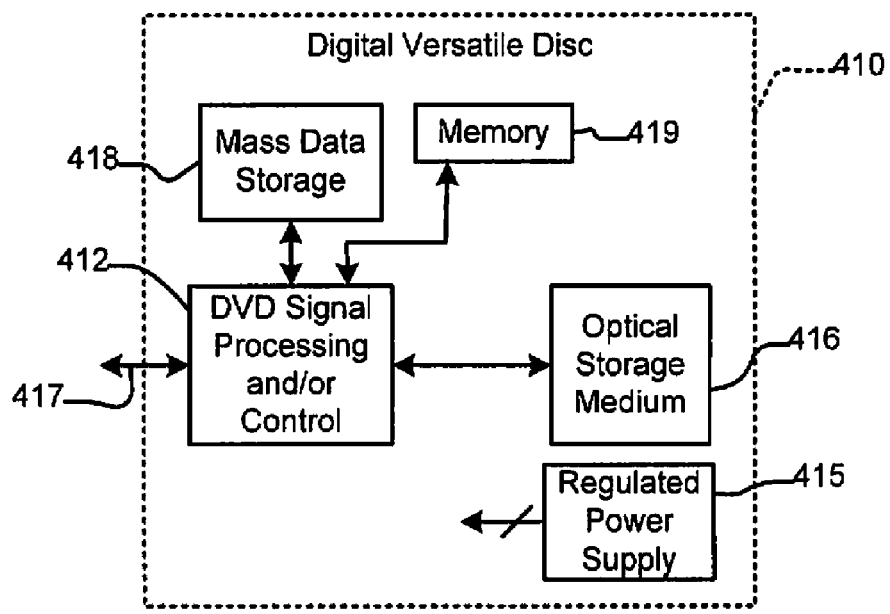
FIG. 8B illustrates the present invention arranged in a digital versatile disc.

Referring now to FIG. 8B, the present invention can be implemented in a digital versatile disc (DVD) drive 410. The present invention may implement at least a portion of a regulated power supply module 415. The power supply module 415 includes one or more outputs that provide power to one or more elements of the DVD drive 410. A signal processing and/or control circuit 412 and/or other circuits (not shown) in the DVD drive 410 may process data, perform coding and/or encryption, perform calculations, and/or format data that is read from and/or data written to an optical storage medium 416. In some implementations, the signal processing and/or control circuit 412 and/or other circuits (not shown) in the DVD drive 410 can also perform other functions such as encoding and/or decoding and/or any other signal processing functions associated with a DVD drive.

The DVD drive 410 may communicate with an output device (not shown) such as a computer, television or other device via one or more wired or wireless communication links 417. The DVD drive 410 may communicate with mass data storage 418 that stores data in a nonvolatile manner. The mass data storage 418 may include a hard disk drive (HDD). The HDD may have the configuration shown in FIG. 8A. The HDD may be a mini HDD that includes one or more platters having a diameter that is smaller than approximately 1.8". The DVD drive 410 may be connected to memory 419 such as RAM, ROM, low latency nonvolatile memory such as flash memory and/or other suitable electronic data storage.

Figure 8C:
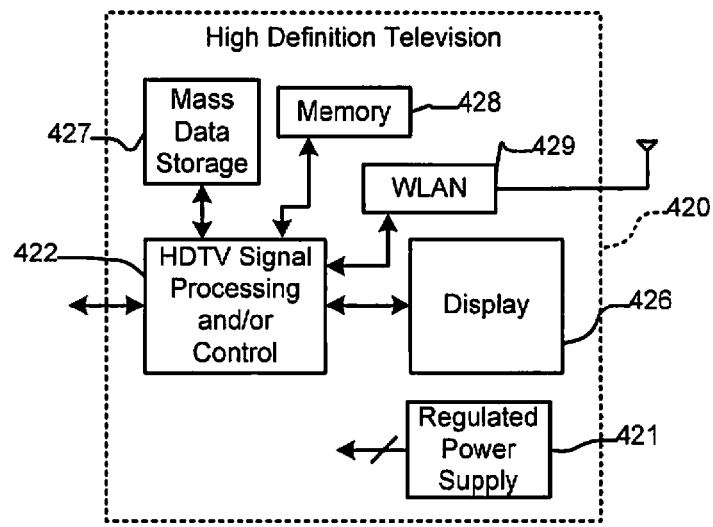
FIG. 8C illustrates the present invention arranged in a high definition television.

Referring now to FIG. 8C, the present invention can be implemented in a high definition television (HDTV) 420. The present invention may implement at least a portion of a regulated power supply module 421. The power supply module 421 includes one or more outputs that provide power to one or more elements of the HDTV 420.

The HDTV 420 receives HDTV input signals in either a wired or wireless format and generates HDTV output signals for a display 426. In some implementations, a signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. At least one HDD may have the configuration shown in FIG. 8A and/or at least one DVD may have the configuration shown in FIG. 8B. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Figure 8D:
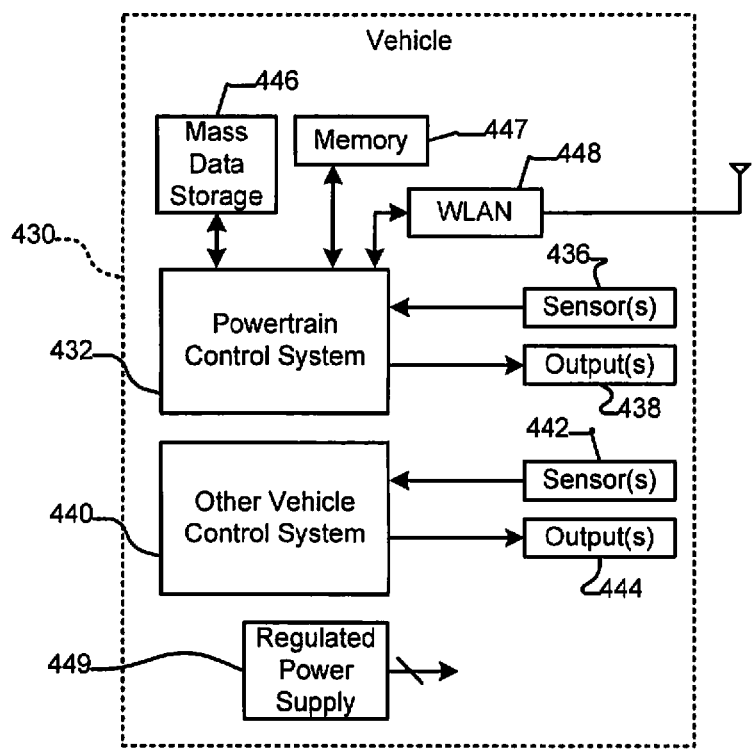
FIG. 8D illustrates the present invention arranged in a control system of a vehicle.

Referring now to FIG. 8D, the present invention can be implemented in a control system of a vehicle 430, a WLAN interface and/or mass data storage of a vehicle control system. The present invention may implement at least a portion of a regulated power supply module 449. The power supply module 449 includes one or more outputs that provide power to one or more elements of the vehicle 430. In some implementations, the present invention can be implemented in a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices for example hard disk drives HDD and/or DVDs. At least one HDD may have the configuration shown in FIG. 8A and/or at least one DVD may have the configuration shown in FIG. 8B. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown).

Figure 8E:
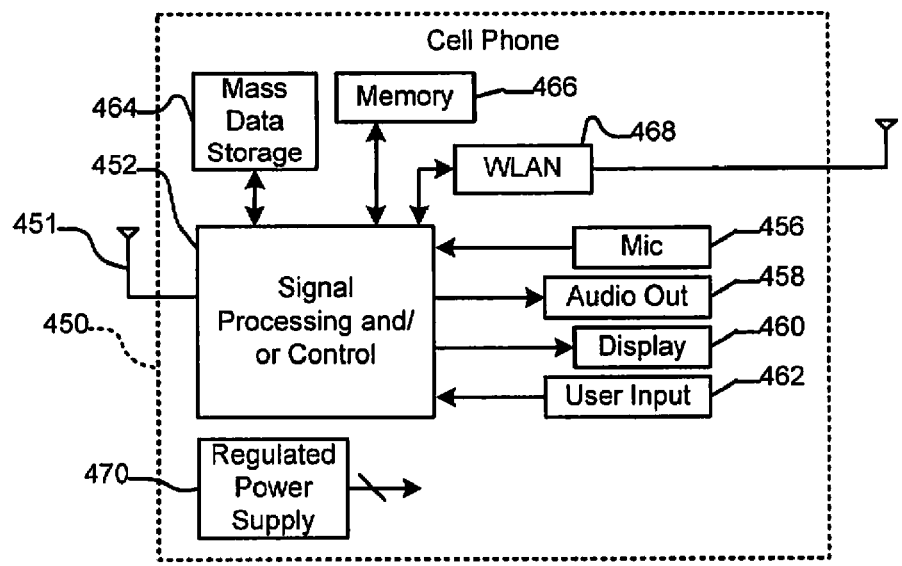
FIG. 8E illustrates the present invention arranged in a cellular phone.

Referring now to FIG. 8E, the present invention can be implemented in a cellular phone 450 that may include a cellular antenna 451. The present invention may implement at least a portion of a regulated power supply module 470. The power supply module 470 includes one or more outputs that provide power to one or more elements of the cellular phone 450.

In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices for example hard disk drives HDD and/or DVDs. At least one HDD may have the configuration shown in FIG. 8A and/or at least one DVD may have the configuration shown in FIG. 8B. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 8F:
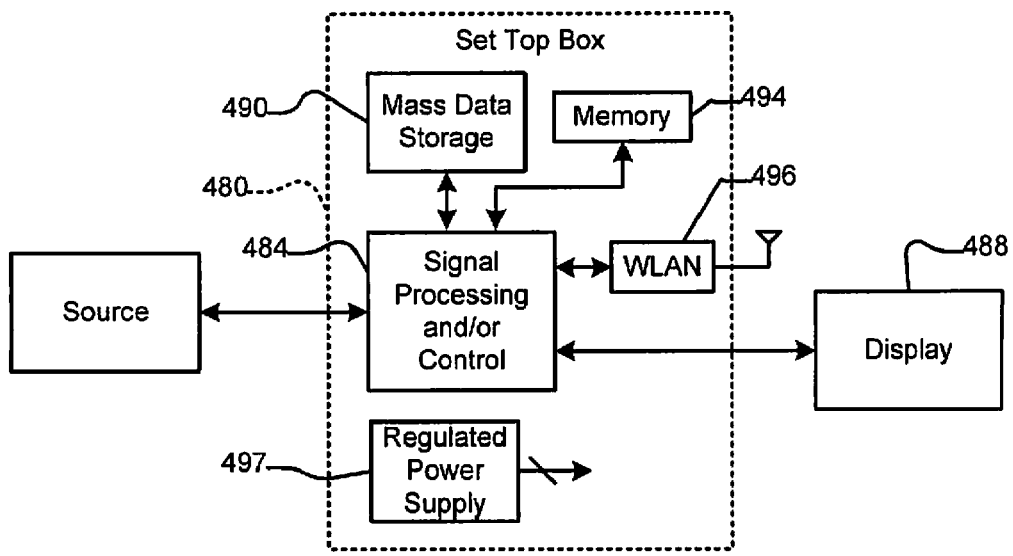
FIG. 8F illustrates the present invention arranged in a set top box.

Referring now to FIG. 8F, the present invention can be implemented in a set top box 480. The present invention may implement at least a portion of a regulated power supply module 497. The power supply module 497 includes one or more outputs that provide power to one or more elements of the set top box 480.

The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices for example hard disk drives HDD and/or DVDs. At least one HDD may have the configuration shown in FIG. 8A and/or at least one DVD may have the configuration shown in FIG. 8B. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Figure 8G:
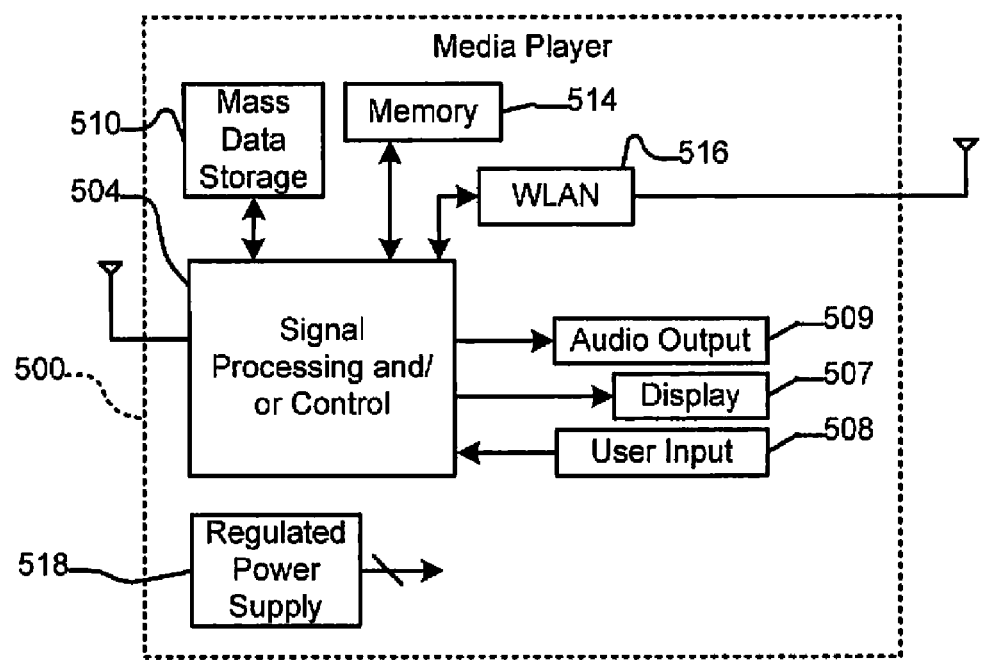
FIG. 8G illustrates the present invention arranged in a media player.

Referring now to FIG. 8G, the present invention can be implemented in a media player 500. The present invention may implement at least a portion of a regulated power supply module 518. The power supply module 518 includes one or more outputs that provide power to one or more elements of the media player 500.

In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. Signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 8A and/or at least one DVD may have the configuration shown in FIG. 8B. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A regulated power supply, comprising:
    an inverter comprising an upper switch and a lower switch that are connected in series; and
    a control module that selectively controls the upper switch and the lower switch in one of a pulse width modulation (PWM) mode and a discrete control mode (DCM), that receives a feedback signal from an output of the regulated power supply and that switches between the PWM mode and the DCM based on the feedback signal.

2. The regulated power supply of claim 1, wherein the control module is configured to:
    compare the feedback signal to a range of an analog-to-digital converter; and
    switch between the PWM mode and the DCM when the feedback signal is outside of the range.

3. The regulated power supply of claim 1, further comprising a current sensor configured to (i) sense current and (ii) generate a current signal, wherein:
    the control module is configured to, based on the current signal, switch between a transient DCM and a steady-state DCM.

4. The regulated power supply of claim 1, further comprising an energy storage device, wherein the control module is configured to:
    charge the energy storage device by placing the inverter in an up state until a current through the energy storage device is equal to a first predetermined current level, wherein a duration of the up state is a first period;
    discharge the energy storage device by placing the inverter in a down state until the current through the energy storage device is equal to a second predetermined current level, wherein a duration of the down state is a second period;
    open the upper switch and the lower switch for a third period based on an output voltage of the regulated power supply being equal to a predetermined voltage; and
    switch from the DCM to the PWM mode subsequent to a fourth period, and
    determine the fourth period based on the first period, the second period and the third period.

* * * * *